United States Patent [19]

Dorn et al.

[11] Patent Number: 4,880,669

[45] Date of Patent: Nov. 14, 1989

[54] METHOD OF PRODUCING A FLAT GASKET

[75] Inventors: Karsten Dorn, Elchingen; Peter Grosch, Finningen; Ingo Kremer, Senden, all of Fed. Rep. of Germany

[73] Assignee: Reinz-Dichtungs GmbH, Neu-Ulm/Donau, Fed. Rep. of Germany

[21] Appl. No.: 223,511

[22] Filed: Jul. 22, 1988

[30] Foreign Application Priority Data

Jul. 24, 1987 [DE] Fed. Rep. of Germany ....... 3724515

[51] Int. Cl.$^4$ .......................... B05D 5/00; B05D 1/32
[52] U.S. Cl. ..................................... 427/210; 277/228; 277/235 B; 277/DIG. 6; 427/282; 427/286
[58] Field of Search ................................. 277/227–230, 277/235 B, DIG. 6, 180; 427/210, 282, 286

[56] References Cited

U.S. PATENT DOCUMENTS 3,794,333 2/1974 Czernik et al. ............. 277/235 B X
4,181,313 1/1980 Hillier et al. ................ 277/235 B X
4,625,979 12/1986 Inciong ................................ 277/180

Primary Examiner—Evan Lawrence
Attorney, Agent, or Firm—Kenyon & Kenyon

[57] ABSTRACT

A flat gasket with a core and mesh-like elastomeric overlays where the overlays are screen-printed onto the core. The dimensions and shape of the mesh can be varied continuously over the surface of the core allowing the gasket to be adjusted for its intended use. Additional reinforcements may be printed onto the core and overlays at the same time the overlays are printed, reducing processing time and expense and allowing the gasket to be further adapted for its intended use.

15 Claims, 2 Drawing Sheets

METHOD OF PRODUCING A FLAT GASKET

This invention relates to the field of gaskets. More particularly, it relates to a method for producing gaskets for internal combustion engines which have greater durability and which provide better seals.

BACKGROUND OF THE INVENTION

Flat gaskets for use in internal combustion engines are known. Such gaskets generally have an inner load-bearing core and a layer of elastomeric material on both sides of the core to improve the seal. Flat gaskets of this type include cylinder-head gaskets, in which individual bars, rings or similar shapes of elastomeric material are applied to the core at critical points. These bars and strips are generally narrow, linear or band-shaped and are applied to the core by screen printing. These gaskets have the disadvantage that, due to the linear or strip-like overlays on the core, the gasket has only one position which provides optimum sealing. This position corresponds to the distribution pattern of the elastomeric strips. These gaskets can deform more in the regions of the elastomeric overlays and less in the other regions. Particular care must be taken to use the gasket in such a way that the regions capable of less deformation are not stressed beyond their capacity. The core of these gaskets must consequently be made sufficiently thick so that the inevitable physical variations in the surfaces to be sealed can be accommodated with sufficient safety margins.

During use, the core structure of these gaskets is subject to settlement, whereby the core becomes thinner. Such settlement can cause the gasket to lose contact with the surfaces to be sealed, leading to potential uncontrolled pressure loses and gasket failure. Another problem is that the core material may, depending on the load, be squeezed out from between the surfaces to be sealed, which also reduces the sealing capacity of the gasket.

Incompressible cores of metal have been used to manufacture gaskets. When metal cores have been used, elastomeric overlays are applied to the sheet metal. In these gaskets, although the core is sufficiently stable and durable, the elastomeric overlays must bear the entire contact pressure. Particularly in situations where dynamic loading is present, the elastomeric overlays are easily destroyed and no longer fulfill their sealing function.

German patent application OS No. 34 39 602 discloses a flat gasket for use as a cylinder-head gasket in an internal combustion engine where a separately fabricated fine-mesh net of elastomeric material is applied to a core of compressible or incompressible material in order to provide an improved surface seal. The production of the net-like elastomeric overlay, separate from the core, is difficult and expensive. Also, individual adaptation of the net structure to individual sealing conditions for a given gasket is not possible. Such variations in sealing conditions result from the machining of the surface to be sealed which results in roughness variations, machining grooves, machining inaccuracies, as well as variations in tolerances between the surfaces.

SUMMARY OF THE INVENTION

It is an object of the invention to provide a method for the production of a flat gasket, which even if a very thin gasket is used, still allows the gasket to deform sufficiently and in which the elastomeric mesh structure used for sealing the gasket can be adapted easily and economically to meet different sealing requirements.

To achieve this object, a mesh-like overlay is applied to both sides of the core of the gasket. The overlay is comprised of an incompressible material and is applied to the core by screen printing.

Because the mesh-like overlay is applied to the core by the screen printing method, production of the gasket is simplified and less expensive. The use of screen printing further allows the geometric shape and/or the dimensions of the mesh openings and the mesh bars to be varied to meet with locally varying operating requirements over the entire surface to be sealed. These variations are easily accomplished with screen printing. The variations in the surface conditions of the surfaces to be sealed can be taken into account when the screen pattern for the gasket is created. The ease of varying the mesh, its openings and bars, allows the adaption of the mesh-like overlay to individual conditions without great technical or production expenditure.

In extreme cases, in addition to the mesh, local reinforcements comprised of the same material as the mesh can be applied simultaneously with the mesh to the core during screen printing. Such reinforcements may have any geometric shape, e.g. circular, crescent-shaped, dot-like, or strip-like. The local reinforcements can be constructed in a solid manner without interruption and their dimensions are adapted to the local conditions. The reinforcements consequently become integrated and solid parts of the mesh, as they are superimposed thereon.

As the mesh is comprised of an incompressible material, "quasi-" compressibility results in the region of the mesh, along the surface of the mesh, whenever pressure is applied. The pressure is substantially restricted to the surface of the mesh, particularly to its bars, which become slightly thinner under load. Thus neither the core of the gasket nor the gasket itself decreases significantly in thickness or increases in width under compression.

The use of the mesh sections which vary in thickness, shape and orientation over the entire surface of the gasket allows the gasket to be tuned to how it will deform and change shape when placed under load. In this manner, even with a very thin core, an optimum seal can be obtained and the surface conditions of the surfaces to be sealed compensated for.

The use of a non-compressible material, for example an elastomer, also prevents the occurrence of the settlement phenomena, which leads to the gasket's decrease in thickness. With the use of a non-compressible mesh material, only the bars of the mesh deform, becoming thinner and moving laterally. The volume of the mesh material, however, remains constant. Thus, the "quasi-" compressibility of the gasket is determined by the lateral yielding capacity of the mesh bars, which in turn is dependent on their dimensions as regards height, width, and the size of the mesh openings.

For special applications, a compressible overlay material can also be used, so that the deformation of the gasket would be further dependent on the properties of the mesh.

Other and further objects of this invention will become obvious upon an understanding of the illustrative embodiments about to be described with reference to the figures or will be indicated in the appended claims, and further advantages not referred to herein will occur to one skilled in the art upon employment of the invention in practice.

BRIEF DESCRIPTION OF THE DRAWINGS

The invention will be described in detail hereafter with reference to the embodiments illustrated in the drawings in which.

DETAILED DESCRIPTION OF THE INVENTION

Figure 1:
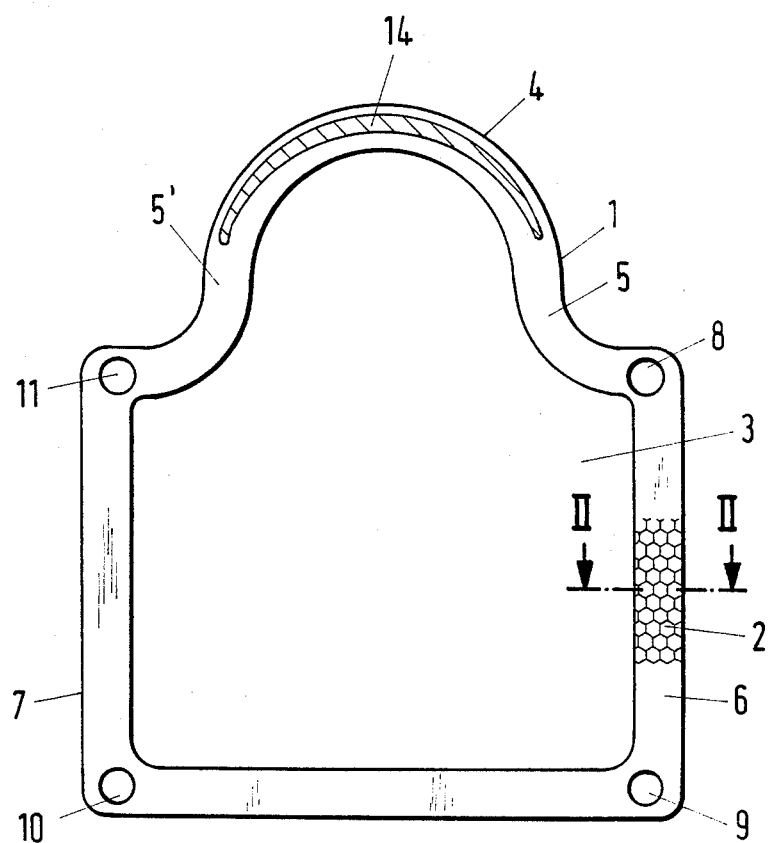
FIG. 1 shows a flat gasket according to the present invention in plan view.
Figure 2:
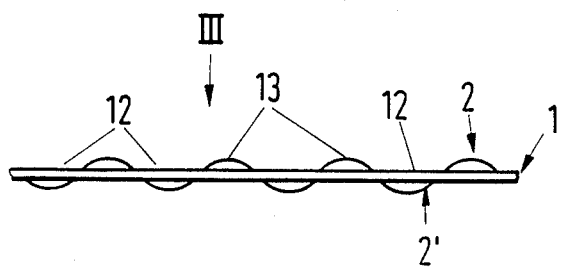
FIG. 2 is a section of FIG. 1 taken along line II—II, drawn to an enlarged scale.
Figure 3:
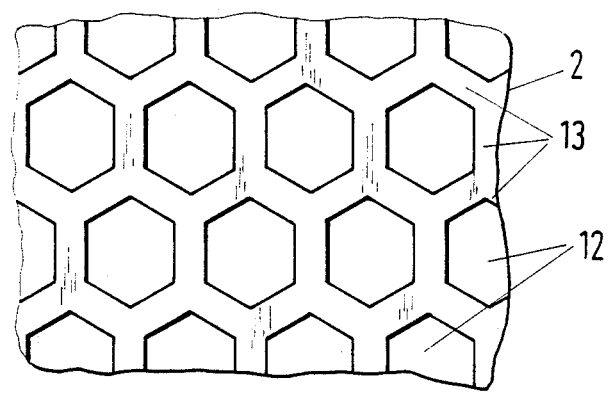
FIG. 3 is a plan view of FIG. 2 taken in the direction of arrow 3.

The gasket shown in FIGS. 1 through 3 is a flat gasket which is placed between two surfaces which must be clamped and sealed together. Such a gasket may be placed between the cylinder head and the casing of an engine. The gasket is particularly suitable for engines, transmissions, gear box sumps, intake elbows, and similar applications.

The gasket comprises a core 1 of the thinnest cross-section possible, to which overlay 2 is applied on one side and overlay 2' to the other. As shown in FIG. 1, core 1 is in the form of a frame and is punched out of metal sheet having a thickness of a few tenths of a millimeter. The core has a large opening 3 in its center. One side of the frame consists of an approximately semi-circular frame section 4 which is joined to adjacent sides of frame 6 and 7 by means of two transition sections, respectively numbered 5 and 5', whose forms are quarter circles with their curves opposite to the curve of section 4. Core 1 may, in other embodiments, be comprised of synthetic incompressible material such as glass or even compressible materials such as rubber/asbestos, paper or pure asbestos.

Fastening holes 8 through 11 allow the gasket to be properly located and fastened between the surfaces to be sealed. As mentioned, core 1 has overlays 2 and 2' on its front and rear sides, comprised of elastomer. The overlays are fashioned in the form of a mesh or lattice as shown in FIG. 3. The mesh grid can assume any geometric form including polygonal, circular, ovoid or circular. Mesh-like overlays 2 and 2' are applied over the entire core 1, with particular attention given to critical sealing points, using the screen printing method. In the figured embodiment, the entire front and rear sides of core 1 are covered by overlays 2 and 2'. The overlays could also be placed on only one side of core 1, or on only a part of each side of core 1, as may be desired. Using screen printing techniques, it is easy to modify and adapt the mesh-like covering of core 1 in numerous different ways so that even within the same overlay, the mesh's structure and pattern can be changed to adapt to varying requirements.

FIGS. 2 and 3 show mesh opening 12 and mesh bars 13 which make up overlays 2 and 2'. The amount of deformation of individual areas within the flat gasket can be adapted to the requirements existing within the gasket by proper choice of mesh shape, size and the ratio of the surface area of the mesh bars 13 to the surface area of the mesh opening 12. A large amount of deformation and resilience for core 1 is ensured by mesh overlays 2 and 2'. In the figured embodiment, mesh bars 13 define an equal-sided hexagonal mesh opening 12. The mesh shape of overlays 2 and 2' also provides a type of labyrinth effect, whereby small defects in individual bars 13 do not result in leakages, as the bars adjacent to the defective bar are unlikely to also be defective. A flat gasket of this type can be used in locations where hitherto only gaskets for liquids could be used.

In the illustrated embodiment, the ability of the overlays 2 and 2' to deform may be reduced by keeping the surface area of core 1 covered by mesh opening 12 smaller than the surface area of core 1 covered by mesh bars 13. Conversely, the ability of overlays 2 and 2' to deform may be increased by keeping the surface area of core 1 covered by mesh bars 13 smaller than the surface area of core 1 covered by mesh openings 12. The elastomeric material (e.g. silicone or polyurethane) comprising the mesh is processed by the manufacturer so as to be suitable for screen printing. The thickness of overlays 2 and 2' as determined by bars 13 may be only a few micrometers, for example, up to 0.3 mm. The figured gaskets use a bar height of 0.06 mm.

At critical sealing points, for example curved section 4, additional sealing reinforcements 14 may be provided, which, when the screen printing method is used, may be a bead of material in which one and/or the other overlay 2 and 2' is embedded. Reinforcements 14 likewise consists of elastomeric materials such as silicone. In a preferred embodiment, reinforcements 14 and overlays 2 and 2' are comprised of the same material and are applied in one operation.

In the figured embodiment, reinforcement 14 extends in a curved manner substantially over the length of section 4 symmetrically with respect to the gasket's central axis. Here reinforcement 14 is continuous and projects a certain amount above overlay 2. It extends over a plurality of mesh openings 12 within section 4 and covers the openings even in the transverse direction. The thickness and width of reinforcement 14 may be varied according to the sealing requirements. The thicker the reinforcement, the wider its width can be. Thus the sealing contact force of reinforcement 14 can be easily adjusted by varying its height. Reinforcements are applied wherever an increased ability to deform and consequent "tighter" sealing is a requirement.

With screen printing techniques, individually tailored reinforcements can still be applied to core 1 in a single operation along with overlays 2 and 2'.

The use of mesh honeycombs in overlays 2 and 2' allows a sealing effect similar to that of an O-ring seal. The desired amount of gasket deformation can be adjusted by using the fact that mesh bars 13 may yield laterally into mesh openings 12 under contact pressure. For example, in a region of the gasket in which the contact pressure are higher, the mesh openings can be kept larger than in the other areas of the gasket.

As many apparently widely different embodiments of this invention may be made without departing from the spirit and scope thereof, it is to be understood that the invention is not limited to the specific embodiments thereof except as defined in the appended claims.

What is claimed is:

1. A method for producing a flat gasket comprising the steps of:
    fabricating a core for the gasket; and
    applying an overlay to both sides of the core using screen printing, the overlay having a mesh structure of bars and openings and consisting of an incompressible material.

2. The method of claim 1, wherein the overlay is provided with at least one additional reinforcement overlying the overlay at pre-selected points and projecting above the overlay, the reinforcement being comprised of the same incompressible material as the overlay.

3. The method of claim 2 wherein the reinforcement is applied to the overlay using screen printing.

4. The method of claim 3 wherein the overlays and reinforcements are printed onto the core in a single simultaneous operation.

5. The method of claim 1 wherein the core is comprised of an incompressible material.

6. The method of claim 5 wherein the core material is glass.

7. The method of claim 5 wherein the core material is metal.

8. The method of claim 5 wherein the core material is a synthetic material.

9. The method of claim 1 wherein the core is comprised of a compressible material.

10. The method of claim 9 wherein the core material is paper.

11. The method of claim 9 wherein the core material is a rubber/asbestos mixture.

12. The method of claim 2 wherein the reinforcement is solid, without interruptions over its length, and its width and length exceed the dimensions of the mesh openings.

13. The method of claim 1 wherein the pattern of the mesh varies over the entire overlay with respect to the dimensions of the bars and openings in order to adapt the gasket to different sealing conditions.

14. The method of claim 1 wherein the overlay has a thickness no greater than 0.3 mm.

15. The method of claim 14 wherein the thickness is on the order of 0.05 mm.

* * * * *